US012544355B2

(12) United States Patent
Chen et al.

(10) Patent No.: US 12,544,355 B2
(45) Date of Patent: Feb. 10, 2026

(54) USE OF MONASCINOL IN PREPARATION OF FAT-REDUCING PRODUCT

(71) Applicant: TIANJIN UNIVERSITY OF SCIENCE AND TECHNOLOGY, Tianjin (CN)

(72) Inventors: Mianhua Chen, Tianjin (CN); Lu Wang, Tianjin (CN); Yan Zhang, Tianjin (CN); Xiaolu Wang, Tianjin (CN); Yurong Wang, Tianjin (CN)

(73) Assignee: TIANJIN UNIVERSITY OF SCIENCE AND TECHNOLOGY, Tianjin (CN)

( * ) Notice: Subject to any disclaimer, the term of this patent is extended or adjusted under 35 U.S.C. 154(b) by 950 days.

(21) Appl. No.: 17/372,347

(22) Filed: Jul. 9, 2021

(65) Prior Publication Data

US 2021/0330639 A1    Oct. 28, 2021

Related U.S. Application Data

(63) Continuation of application No. PCT/CN2020/126114, filed on Nov. 3, 2020.

(30) Foreign Application Priority Data

Dec. 23, 2019   (CN) .......................... 201911338798.X
Dec. 23, 2019   (CN) .......................... 201911340509.X

(51) Int. Cl.
*A61K 31/352*    (2006.01)
*A23L 33/00*     (2016.01)
*A23L 33/10*     (2016.01)
*A61P 1/16*      (2006.01)

(52) U.S. Cl.
CPC ............ *A61K 31/352* (2013.01); *A23L 33/10* (2016.08); *A23L 33/30* (2016.08); *A61P 1/16* (2018.01)

(58) Field of Classification Search
CPC ....... A61K 31/352; A23L 33/10; A23L 33/30; A61P 1/16; A61P 3/04
See application file for complete search history.

(56) References Cited

U.S. PATENT DOCUMENTS

2010/0256227 A1   10/2010  Liu

FOREIGN PATENT DOCUMENTS

| CN | 101323861 A | 12/2008 |
|----|-------------|---------|
| CN | 101331940 A | 12/2008 |
| CN | 101338324 A | 1/2009 |
| CN | 101564127 A | 10/2009 |
| CN | 101862324 A | 10/2010 |
| CN | 102908343 A | 2/2013 |
| CN | 104587468 A | 5/2015 |
| CN | 105734091 A | 7/2016 |
| CN | 108559304 A | 9/2018 |
| CN | 110551764 A | 12/2019 |
| CN | 110898053 A | 3/2020 |
| CN | 110938553 A | 3/2020 |
| CN | 111296683 A | 6/2020 |
| CN | 111304093 A | 6/2020 |
| CN | 111423986 A | 7/2020 |
| CN | 101862327 A | 10/2020 |
| CN | 112314820 A | 2/2021 |
| CN | 112575038 A | 3/2021 |
| CN | 113100337 A | 7/2021 |
| CN | 113201230 A | 8/2021 |
| JP | 2008056618 A | * 3/2008 |
| TW | 201100435 A | 1/2011 |
| TW | I437001 B | 5/2014 |

OTHER PUBLICATIONS

Heber et al., Cholesterol-lowering effects of a proprietary Chinese red-yeast-rice dietary supplement (Am J Clin Nutr, 69, 231-6). (Year: 1999).*
Li et al. HMG-CoA Reductase Inhibitors from Monascus-Fermented Rice (Article ID 872056, p. 1-6). (Year: 2013).*
Walpole et al. The weight of nations: an estimation of adult human biomass. (BMC Public Health, 12:439) (Year: 2012).*
First Office Action of CN201911338798X.
Notice of Allowance of CN201911338798X.
"Yellow Pigment Influencing Factors on Monascus Solid-State Fermentation", by Shichen Jia, Master Degree thesis of Tianjin University of Science and Technology, Mar. 2016.
"Chemical Constituents of the Fungus Monascus pilosus BCRC 38093-Fermented Rice", Chemistry of Natural Compounds, vol. 51, No. 3, May 2015, pp. 554-556.
"Effect of a *Monascus* sp. red yeast rice extract on germination of bacterial spores", Frontiers in Microbiology, vol. 12, May 24, 2021, pp. 1-10.

(Continued)

*Primary Examiner* — Joseph K Mckane
*Assistant Examiner* — Meghan C Heasley
(74) *Attorney, Agent, or Firm* — J.C. PATENTS

(57) ABSTRACT

The present application provides use of Monascinol in preparation of a fat-reducing product, a method for preventing or treating a disease related to abnormal lipid metabolism, and a fat-reducing product including Monascinol. The fat-reducing product includes a fat-reducing functional food and a fat-reducing drug, the fat-reducing functional food is used for preventing or improving a sub-health state related to obesity in an individual, the fat-reducing drug is used for preventing or treating a disease related to abnormal lipid metabolism in an individual. It is found that in the solution of the present application the Monascinol has new functions of significantly lowering blood lipid, controlling weight gain, and inhibiting body fat accumulation; and has low cytotoxicity, thereby having high use safety when serving as a fat-reducing product.

7 Claims, 6 Drawing Sheets

(56) References Cited

OTHER PUBLICATIONS

"Monaphilones A-C, three new antiproliferative azaphilone derivatives from Monascus purpureus NTU 568", J. Agric. Food Chem. 2010, 58, 8211-8216.

"Screening of Monascus producing only yellow pigments", Microbiology China, vol. 28, No. 4, Mar. 27, 2001, pp. 67-69.

"Studi in Silico Metabolit Sekunder Kapang *Monascus* sp. Sebagai Kandidat Obat Antikolesterol dan Antikanker", Alchemy Jurnal Penelitian Kimia, vol. 15(1) 2019, 104-123.

"Study on biological characteristics of yellow pigment producer strain Monascus HB-5", Food Science and Technology, vol. 47, No. 7, Jul. 20, 20026, pp. 47-51.

International Search Report for PCT/CN2020/126114.

NPL1: "The blood lipid regulation of Monascus-produced monascin and ankaflavin via the suppression of low-density lipoprotein cholesterol assembly and stimulation of apolipoprotein A1 expression in the liver", Journal of Microbiology, Immunology and Infection (2018)51, 27-37.

NPL2: "A new class of lipid-lowering drugs—HMG—COA reductase inhibitors", Chinese Pharmacological Bulletin, vol. 5, p. 316, Dec. 31, 1990.

NPL3: "Monascin and Ankaflavin Act as Novel Hypolipidemic and High-Density Lipoprotein Cholesterol-Raising Agents in Red Mold Dioscorea", J. Agric. Food Chem. 2010, 58, 9013-9019.

NPL4: "Monascin and ankaflavin act as natural AMPK activators with PPARa agonist activity to down-regulate nonalcoholic steatohepatitis in high-fat diet-fed C57BL/6 mice", Food and Chemical Toxicology 64 (2014) 94-103.

NPL5: "The Research of High Activity Lipase Inhibitor from Monascus", China Food Additives, vol. 5, pp. 54-61, 2017.

NPL6: "HMG-Coa Reductase Inhibitors from Monascus-Fermented Rice", Journal of Chemistry, vol. 2013, Article ID 872056, 6 pages.

NPL7: "Relation between baseline lipid levels and effectiveness of HMG-CoA reductase inhibitors", South China Journal of Cardiovascular Diseases, vol. 7, No. 2, pp. 110-113, Apr. 2001.

NPL8: "Advances of new functional ingredients and efficacy on monascus fermented products", China Food Additives, No. 4, pp. 179-184, Dec. 2015.

First Office Action o the priority CN application 201911340509X.

\* cited by examiner

USE OF MONASCINOL IN PREPARATION OF FAT-REDUCING PRODUCT

CROSS-REFERENCE TO RELATED APPLICATIONS

This application is a continuation of International Application No. PCT/CN2020/126114, filed on Nov. 3, 2020, which claims priority to Chinese Patent Application No. 201911340509.X, titled "USE OF MONASCINOL IN PREPARATION OF FAT-REDUCING PRODUCT", filed to CNIPA (China National Intellectual Property Administration) on Dec. 23, 2019, and Chinese Patent Application No. 201911338798.X, titled "*MONASCUS* FOR PREPARATION OF MONASCINOL AND METHOD FOR PREPARING MONASCINOL BY USING SAME", filed to CNIPA on Dec. 23, 2019, the contents of the above-mentioned applications are hereby incorporated by reference in their entireties.

TECHNICAL FIELD

The present application relates to use of monascinol, and in particular, to use of monascinol in preparation of a fat-reducing product.

BACKGROUND

Lipid, as one of components of the cell membrane and the lipoprotein, which is mainly composed of cholesterol and triglyceride, is not only used for synthesis of sterols in vivo, but also provides a human body with energy required for metabolism. Excessive lipid accumulation in the human body can cause hyperlipidemia. The hyperlipidemia (HLP) is a metabolic disease in which levels of total cholesterol (TC), triglyceride (TG) and low-density lipoprotein cholesterol (LDL-C) are significantly increased, and the level of high-density lipoprotein cholesterol (HLD-C) is low in human plasma, and which is a key factor that induces atherosclerosis, fatty liver and other cardiovascular diseases.

Cholesterol is one of the main components of a cell membrane of an organism, and it is also a precursor of all steroid hormones, and is essential for life activities. The liver is a core organ for cholesterol metabolism, transports cholesterol by a variety of apolipoproteins and peripheral tissues mainly. Normally, synthesis, absorption and excretion of the cholesterol remain steady state, excessive synthesis or absorption of cholesterol can lead to metabolic disorder of cholesterol, causing hyperlipidemia. Triglyceride is formed by esterification of glycerol and fatty acids, is a main component of blood lipid and is also an important energy-supply substance for organisms. The triglyceride is mainly produced in two routes: a phosphatidic acid route and a monoglyceride route. In liver cells, the triglyceride is mainly synthesized through the phosphatidic acid route, and then synthesizes very low-density lipoprotein using apolipoprotein, cholesterol, etc., which is transported through blood circulation to the extrahepatic tissue for storage or utilization. When the synthesis of the triglyceride increases, the secretion of the very low-density lipoprotein decreases, and the oxidation capability of the fatty acid decreases in liver cells, they all can lead to accumulation of the triglyceride in a liver, forming a non-alcoholic fatty liver disease (NAFLD). The prevalence of NAFLD is closely related to obesity. Through diet regulation, intervention and prevention at an early stage of NAFLD is currently an important link to prevent NAFLD from further deterioration. The monoglyceride route is mainly taken place in the small intestine, where the fat ingested by the human body is initially digested by the oral cavity and stomach, and is hydrolyzed by pancreatic lipase into glycerol and fatty acids in the small intestine, and then absorbed by the human body. Intake of excessive triglyceride can lead to obesity; a pancrelipase inhibitor can inhibit the activity of the pancrelipase in the small intestine and reduce the absorption of lipids to a certain extent, which is one of effective ways to treat obesity with drugs.

Although the triglyceride and the cholesterol are important components of human lipids, excessive storage will cause a sharp increase in the risk of obesity, cardiovascular disease, diabetes and other diseases. Hyperlipidemia caused by obesity can lead to arteriosclerosis and increase a risk of cardiovascular disease; obese people are more likely to develop fatty livers; in obese people, an excess of fat in the body will also be deposited in the respiratory tract, affecting the function of the respiratory system, and worsening symptoms of an asthma patient. Obesity is an important "fulcrum" that drives the occurrence of diseases such as cardiovascular diseases, diabetes, asthma, fatty liver, osteoarthritis and cancers.

*Monascus* has been used in fermented food for thousands of years in China. Lovastatin (Monacolin K), found in fermentation products of *Monascus*, has an effect of lowering blood lipid by inhibiting the synthesis of endogenous cholesterol. *Monascus* pigments are secondary metabolites of *Monascus*. There are more than 60 types of *Monascus* pigments with clear and complete structural analysis data recorded in literatures. Professor Ziming PAN et al. researched and found that monascin (MS) and ankaflavin (AK) reduce the fatty degeneration in mouse FL83B liver cells induced by oleic acid through inhibiting the production of the triglyceride and facilitating (3-oxidation of the fatty acid. Yuxiang FANG et al. researched and found that MS and AK non-competitively inhibit the activity of the pancrelipase, having potential anti-obesity effects. Xucong Lv et al. found that *Monascus* pigments can improve fat accumulation in livers of Wistar rats with a high fat diet, and improve metabolic disorder of lipids. MS and AK, two *Monascus* yellow pigments, have physiological activities of preventing body fat accumulation and improving dyslipidemia.

In 2008, Japanese invention patent JP2008-56618A first reported that a *Monascus* yellow pigment named Monascinol has anti-inflammatory and anti-cancer functions. In 2014, Taiwan invention patent TW1437001B first reported a *Monascus* yellow pigment named Monascuspiloin, which can inhibit the activity of 5α-reductase, reduce the production of a male hormone dihydrotestosterone, and treat symptoms related to male hormone imbalance. After comparison, pigments Monascuspiloin and Monascinol have the same structure and are the same compound.

It has not been found that the pigments Monascuspiloin and Monascinol have the effects of lowering blood lipid, controlling weight gain, and inhibiting body fat accumulation.

SUMMARY

The present application provides use of monascinol in preparation of a fat-reducing product, where the monascinol has the functions of significantly lowering blood lipid, controlling weight gain, and inhibiting body fat accumulation.

In the solution of the present application, monascinol has the same structure as pigments Monascuspiloin and Monascinol and is the same substance as the latter, and in the present application, the applicant named it as Monascinol, or MC for short. The applicant finds that it has the functions of significantly lowering blood lipid, controlling weight gain, and inhibiting body fat accumulation.

The present application provides use of Monascinol in preparation of a fat-reducing product.

In a specific embodiment of the present application, the fat-reducing product is used for reducing triglyceride.

In a specific embodiment of the present application, the fat-reducing product includes a fat-reducing functional food.

Further, the fat-reducing functional food is used for preventing or improving a sub-health state related to obesity in an individual.

In another specific embodiment of the present application, the fat-reducing product includes a fat-reducing drug.

Further, the fat-reducing drug is used for preventing or treating a disease related to abnormal lipid metabolism in an individual.

Further, the disease related to abnormal lipid metabolism in an individual includes one or more of fatty liver, cardiovascular disease, diabetes and asthma.

Further, the fatty liver includes non-alcoholic fatty liver.

Furthermore, the dosage form of the fat-reducing drug can be in the form of a hard capsule, a soft capsule, a tablet, a granule, a powder, a suspension, a syrup, an oral liquid or an injection.

According to different dosage forms selected, the fat-reducing drug may also include pharmaceutically acceptable an excipient, an adjuvant material and the like.

Further, in the solution of the present application, the fat-reducing drug is a unit dosage. For example, the unit dosage contains 50-200 mg of the Monascinol. Of course, the amount of the Monascinol can also be appropriately adjusted according to different objects of administration, as long as the prevention or treatment of a disease related to abnormal lipid metabolism in an individual can be achieved.

In the solution of the present application, the amount of the Monascinol in the unit dosage is an amount of an active ingredient in a single-administered medicament based on a body weight of a general adult. The unit dosage is a dosage that satisfies the active ingredient required for one administration, and a common unit dosage is, for example, one unit (one piece of) tablet, one unit (one needle) injection or powder injection, etc. The amount of drugs required for an administration to a patient at one time can be conveniently obtained by calculating a product of the patient's weight and a unit weight dose required for an administration to the patient at one time. For example, in a process of drug preparation, it is generally considered that a weight of an adult is 50-90 kg, and an administration dosage can be determined by an equivalent dose conversion relation between unit weight doses of an experimental animal and a human. For example, it can be determined according to a guidance proposed by the FDA, SFDA and other drug administration agencies, or referring to "*Conversion of equivalent doses between animals and between animals and humans in pharmacological tests*" (Jihan HUANG et al., *Chinese Journal of Clinical Pharmacology and Therapeutics,* 2004, September; 9(9):1069-1072). In the embodiments of the present application, a conversion factor 0.12 based on body surface areas of human and hamster can be used to convert doses of the human and the hamster.

The present application provides a method for preventing or treating diseases related to abnormal lipid metabolism in an individual by using the abovementioned fat-reducing drug.

The Monascinol in the solution of the present application can be obtained by utilizing the method for obtaining Monascuspiloin recorded in Taiwan invention patent TW1437001 in 2014 or the method for obtaining Monascinol recorded in JP2008-56618A.

Or, it can be obtained by the following method for preparing the Monascinol, including:

1) preparing a solid fermentation medium: sterilizing rice after soaking in water to obtain the solid fermentation medium;

2) preparing an inoculum culture: activating the *Monascus*, inoculating the activated *Monascus* into an inoculum medium and culturing to obtain the inoculum culture;

3) fermenting: inoculating the inoculum culture into the solid fermentation medium for fermentation to obtain fermented rice, namely red yeast rice;

4) extracting Monascinol: after the red yeast rice is dried and pulverized, extracting with ethanol, and separating and purifying Monascinol from the extract by high performance liquid chromatography.

In the above method, a source of the rice is not particularly limited, and the rice may be, for example, generally commercially available rice.

The *Monascus* used may be the *Monascus* recorded in Taiwan invention patent TW1437001 in 2014, or the *Monascus* with an Accession No. CGMCC 18578, which was deposited by the applicant at the China General Microbiological Culture Collection Center (abbreviated as CGMCC, its address is No. 3, Courtyard 1, West Beichen Road, Chaoyang District, Beijing) on Sep. 20, 2019.

In the case of using *Monascus* with CGMCC No. 18578 for preparation, in order to increase the yield, the Monascinol can also be prepared according to the following steps:

1) preparing a solid fermentation medium: sterilizing rice after soaking in water to obtain the solid fermentation medium;

2) preparing an inoculum culture: activating the *Monascus*, inoculating the activated *Monascus* into an inoculum medium and culturing to obtain the inoculum culture;

3) fermenting: inoculating the inoculum culture into the solid fermentation medium at a ratio of 1:5-10 L/kg for fermentation to obtain fermented rice, namely red yeast rice;

4) extracting Monascinol: after the red yeast rice is dried and pulverized, extracting with 60%-90% ethanol, with a weight ratio of the red yeast rice to ethanol being controlled to be 1:5-20 during extraction, and separating and purifying Monascinol from the extract by high performance liquid chromatography.

In another specific embodiment of the present application, the method for preparing the Monascinol includes the following steps:

1) preparing a solid fermentation medium: spreading wet rice, which is formed after soaking in water, in a conical flask, and sterilizing, so as to obtain the solid fermentation medium;

2) preparing an inoculum culture: activating the *Monascus* using an activation medium, then inoculating into an inoculum medium for culturing, so as to produce the inoculum culture of the *Monascus;*

3) fermenting: filtering the inoculum culture of the *Monascus* to remove mycelium, inoculating the inoculum culture of the *Monascus* with mycelium removed into the solid fermentation medium at a ratio of 1:5-10 L/kg to perform fermentation, so as to obtain fermented rice, namely red yeast rice;

4) extracting Monascinol: after the red yeast rice obtained after fermentation is dried and pulverized, extracting with 60%-90% ethanol, with a weight ratio of the red yeast rice to ethanol being controlled to be 1:5-20 during extraction, and separating and purifying Monascinol from the extract by high performance liquid chromatography.

Further, in Step 1), during the soaking process, a ratio of rice to water is 1:1 kg/L, and the soaking is performed at room temperature for 4-24 hours.

Further, in Step 2), the activation temperature of the *Monascus* is 25-35° C., and the activation culture is performed for 2-5 days. Further, in Step 2), the activation medium is a wort slant medium.

The wort slant medium is a conventional medium in the art and can be purchased. It can also be prepared as follows: slightly pulverizing barley malt kernels, weighing 250.0 g, adding 1 L of water, being subjected to a thermostatic waterbath at 60° C. for 4 hours; after filtration, adding water, so as to dilute the sugar content to 12° Brix, then adding 3.0 g agar, and sterilizing at 121° C. and 0.1 MPa for 20 mins.

Furthermore, in Step 2), inoculating the activated *Monascus* into the inoculum medium for culturing is performed in a constant temperature shaker, where a temperature of the shaker is controlled at 25-35° C., a speed of the shaker is 150-200 r/min, and culture time is 24-48 hours.

The inoculum medium is a conventional medium in the art and can be purchased. It can also be prepared according to the following formula. The inoculum medium includes, by weight, 6.0 parts of glucose, 2.0 parts of peptone, 1.0 part of $NaNO_3$, 1.0 part of $KH_2PO_4$, 0.5 parts of $MgSO_4$ and 100 parts of water. For example, it can be obtained by dissolving 6.0 g of glucose, 2.0 g of peptone, 1.0 g of $NaNO_3$, 1.0 g of $KH_2PO_4$ and 0.5 g of $MgSO_4$ into 100 mL of water, and aliquoting into 250 mL of conical flasks, which is sealed with 8 layers of gauze and kraft paper, and sterilizing for 20 mins at 121° C. and 0.1 MPa.

Further, in Step 3), the fermentation temperature is 25-35° C., and the fermentation time is 10-25 days.

In Step 4), a process of separating the extracted liquid by high performance liquid chromatography to obtain the Monascinol further includes obtaining Monascin (abbreviated as MS) from the extracted liquid. The applicant found that MS and MC exist in the extracted liquid at the same time, and the two can be separated from the extracted liquid through conventional technical means. For example, based on the difference in retention time of MS and MC, MS and MC are collected separately during the separation process by high performance liquid chromatography, which can be implemented by those skilled in the art.

Further, MS can be converted into MC through Formula 1; the method for preparing MC provided in the present application can also include step 5) converting MS obtained from the extracted liquid into MC, so as to further increase the yield of MC,

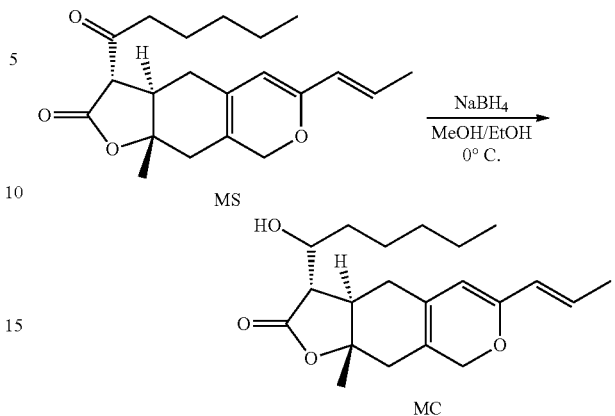

(Formula 1)

The MS is further converted into MC according to Formula 1, which can further increase the yield of MC produced by *Monascus* fermentation in the present application.

The solution of the present application has the following advantages:

1) It is discovered for the first time that the Monascinol has the functions of significantly lowering blood lipid, controlling weight gain, and inhibiting body fat accumulation; and has low cytotoxicity, thereby having high use safety when serving as a fat-reducing product.

2) The present application provides the use of Monascinol in preparation of a fat-reducing functional food, for preventing or improving a sub-health state related to obesity in an individual, the individual includes, for example, sub-healthy people who need weight management, including adults and teenagers.

3) The present application further provides the use of Monascinol in preparation of a fat-reducing product, including a fat-reducing drug, for preventing or treating a disease related to abnormal lipid metabolism in an individual, where the diseases include fatty liver, cardiovascular disease, diabetes and asthma; for preventing or treating a series of diseases closely related to obesity, such as diabetes, cardiovascular disease, asthma, and osteoarthritis.

BRIEF DESCRIPTION OF DRAWINGS

In order to illustrate the technical solutions of embodiments of the present application more clearly, the following will briefly introduce the drawings that need to be used in the embodiments of the present application; obviously, the drawings described below are only some embodiments of the present application, and for those skilled in the art, other drawings can be obtained from the drawings without creative work.

FIG. 9a-FIG. 9c show results of liver tissue sections of hamsters in each group under a 400× light microscope.

FIG. 10a-FIG. 10c show results of adipose tissue sections of hamsters in each group under a 400× light microscope.

DESCRIPTION OF EMBODIMENTS

The HepG2 cells in the examples of the present application were purchased from Xiehe Cell Resource Center (Resource Number: 3111C0001CCC000035), various reagents used in experiments are all conventional reagents, all of which are commercially available. Monascinol (abbreviated as MC) can be prepared through the method in JP2008-56618A or TW1437001B. Monascin (abbreviated as MS) can be prepared through the method in JP2008-56618A. Monascinol (abbreviated as MC) and Monascin (abbreviated as MS) can also be prepared by using *Monascus* (*Monascus* sp) recorded in the present application. The *Monascus* (*Monascus* sp) is the *Monascus* with the Accession No. CGMCC 18578, which was deposited at the China General Microbiological Culture Collection Center (abbreviated as CGMCC) on Sep. 20, 2019. The raw material is generally commercially available rice, and ingredients in mediums are all commercially available conventional reagents in the art.

Example 1 Cytotoxicity of Monascinol

1) Modeling HepG2 Cells with Oleic Acid

HepG2 cells in good growth condition were inoculated in a 6-well plate at $2*10^5$ cells/mL, 1 mL per well. When cell adhesion rate reached 80%-90%, the medium was discarded. A blank group and a model group were set, where a complete medium was added to the blank group, 0.3 mmol/L oleic acid induction solution diluted with a complete medium was added to the model group, at 2 mL per well; after 24 hours of culture, the accumulation of lipid drops in the cells was observed by oil red 0 staining.

Figures 1A, 1B:
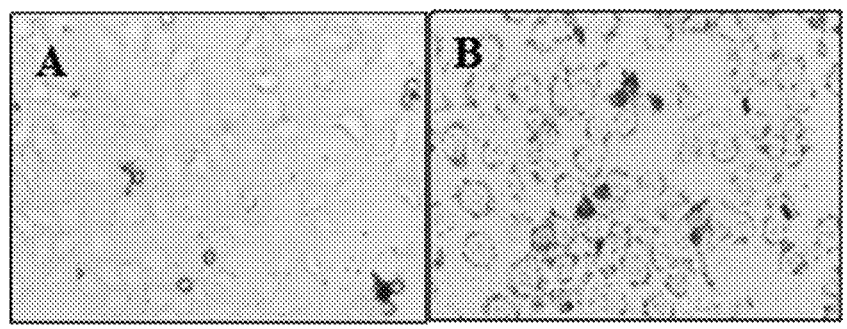
FIG. 1A shows a situation of HepG2 cells before adding oleic acid.
FIG. 1B shows a situation of lipid accumulation of HepG2 cells after adding oleic acid.

In the blank group, the morphology of the cells was in a spindle shape, with clear cell contours and no obvious accumulation of lipid drops in the cells; after 24 hours of incubation, adherent HepG2 cells added with 2 mL of the oleic acid induction solution (0.3 mmol/L) per well showed no obvious cell proliferation damage, and compared with the blank group, apparent red lipid drops can be seen around cell nuclei at cell contours, and cell contours were clear, indicating that the modeling is successful. Referring to FIG. 1, FIGS. 1A-1B show effects of oleic acid before and after addition on lipid accumulation of HepG2 cells (inverted microscope×400).

2) Cytotoxicity Experiment of Monascinol (Abbreviated as MC) and Monascin (Abbreviated as MS) on HepG2 Cells Modeled with Oleic Acid a. HepG2 cells in good growth condition were inoculated in a 96-well plate at $5*10^4$ cells/mL, 100 μL per well. When the cell adhesion rate reached 80%-90%, the medium was discarded.

b. MS and MC were each dissolved in dimethyl sulfoxide (DMSO) to prepare a 5 mg/mL of mother liquid, and the mother liquid was stored at −20° C. The 5 mg/mL of mother liquid was diluted with a complete medium containing 0.3 mmol/L of oleic acid to obtain MS sample concentrations or MC sample concentrations (2, 4, 6, 8, 10, 12 μg/mL) required for the experiment, ensuring that a final concentration of DMSO in each sample is 0.5%.

c. A modeling group and a dosing group were set, and on Day 1 (after discarding the medium), 200 μL of complete medium containing 0.3 mmol/L oleic acid was added to the HepG2 cells in the modeling group; 200 μL of complete medium containing 0.3 mmol/L of oleic acid and the above different concentrations of MS or MC samples was added to the HepG2 cells in the dosing group.

Figure 2:
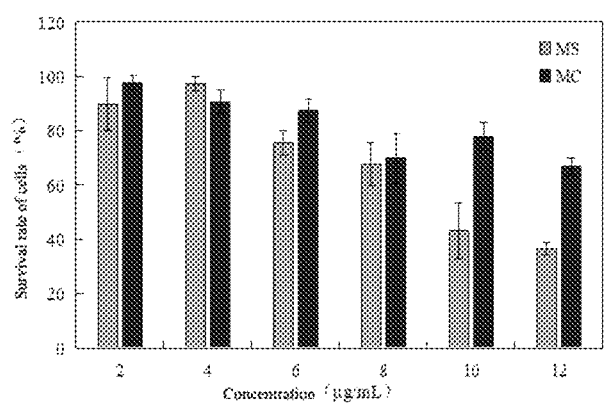
FIG. 2 shows effects of different doses of MC and MS on survival rate of HepG2 cells modeled with oleic acid.

After 24 h, the survival rate of HepG2 cells in each group was detected based on a MTT experiment method.

d. results are shown in FIG. 2. When the administration concentration of MS reached 10 μg/mL or more, the survival rate of cells was only 36.7%, cytotoxicity began to appear, and a large number of cells died. When the administration concentration of MC was 12 μg/mL, the survival rate of cells was 66.7%, which had significantly less cytotoxicity than MS at the same administration concentration.

Example 2 Effects of Different Dosages of Monascinol on Triglyceride Content in Cells Experiments were Performed as Follows:

a. HepG2 cells in good growth condition were inoculated in a 6-well plate at $2*10^5$ cells/mL, 1 mL per well, cultured for 12 h, and after the cells adhered to the wall, the medium was discarded.

b. after the medium was discarded, a blank group, a modeling group and a dosing group were set.

Figures 3, 4:
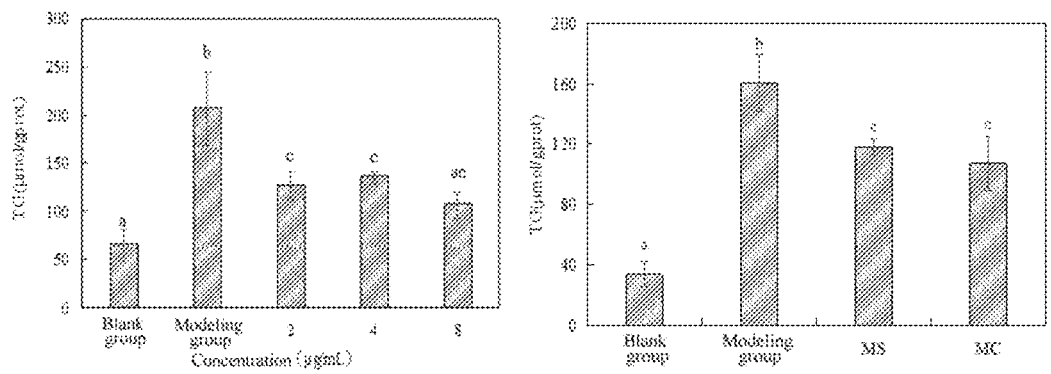
FIG. 3 shows effects of different administration concentrations of MC on TG content in HepG2 cells modeled with oleic acid.
FIG. 4 shows effects of MC and MS on TG content in HepG2 cells modeled with oleic acid.

Blank control group: added with 2 mL of a complete medium per well;

Oleic acid modeling group: added with 2 mL of a complete medium containing 0.3 mmol/L of oleic acid per well;

MC low dose group: added with 2 mL of a complete medium containing 0.3 mmol/L of oleic acid and 2 μg/mL of Monascinol per well;

MC middle dose group: added with 2 mL of a complete medium containing 0.3 mmol/L of oleic acid and 4 μg/mL of Monascinol per well;

MC high dose group: added with 2 mL of a complete medium containing 0.3 mmol/L of oleic acid and 8 μg/mL of Monascinol per well;

After completing the administration, the cells of each group were cultured for 24 hours and then collected, a triglyceride kit (Beijing Applygen Technologies Inc.) was utilized to measure the content of triglyceride in HepG2 cells of each group.

c. results are shown in FIG. 3. Different letters indicate significant differences from the blank group, P<0.01.

It can be seen from FIG. 3 that, compared with the blank group, the TG content in the modeling group had a significant increase (P<0.01), where the TG content in cells reached 3.2 times that of a blank group, indicating that the modeling was successful. Compared with the modeling group, low, medium and high doses of MC can significantly (P<0.01) reduce the TG content in cells. When the MC concentration was 2 μg/mL and 4 μg/mL, the TG content in the cells decreased by 38.9% and 34.6%, respectively; when the concentration was 8 μg/mL, the TG content in the cells decreased by 51.3%. Therefore, MC effectively reduced the TG content in HepG2 cells.

Example 3 Effects of Monascinol (Abbreviated as MC) and Monascin (Abbreviated as MS) on the Triglyceride Content in HepG2 Cells Modeled with Oleic Acid Experiments were Performed as Follows:

Firstly, normal HepG2 cells were obtained, and HepG2 cells modeled with oleic acid were obtained according to the method in Example 1 (a concentration of oleic acid was 0.3 mmol/L).

On day 1, blank control group: normally cultured HepG2 cells without treatment; oleic acid modeling group (the concentration of oleic acid is 0.3 mmol/L): normally culture HepG2 cells modeled with oleic acid without treatment; MC group: HepG2 cells modeled with oleic acid were administered with 2 μg/mL of Monascinol, i.e., MC; MS group: HepG2 cells modeled with oleic acid were administered with 2 μg/mL of Monascin (MS).

After completing the administration, the cells of each group were cultured for 24 hours and then collected, a triglyceride kit (Beijing Applygen Technologies Inc.) was utilized to measure the content of triglyceride in HepG2 cells of each group, results are shown in FIG. 4.

It can be seen from FIG. 4 that, after incubating HepG2 cells with 0.3 mmol/L of oleic acid for 24 h, the TG content in the cells was significantly higher than that in the blank group (P<0.01). Both MS and MC at the same concentration significantly reduced the TG content in the cells (P<0.01). MS and MC at 2 μg/mL can reduce the TG content in cells by 26.3% and 33.3%, respectively, and the lipid-lowering effects of the two had no significant difference (P>0.01).

Figures 5A, 5B, 5C:
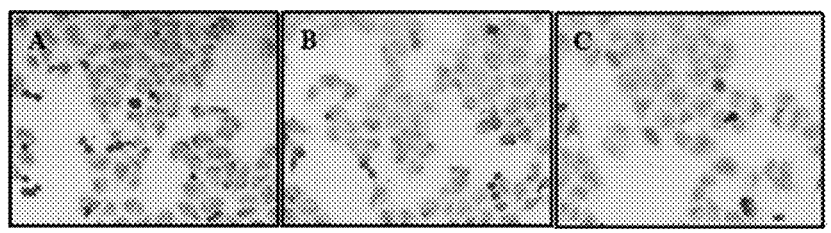
FIG. 5A is a diagram of lipid accumulation in HepG2 cells of an oleic acid modeling group.
FIG. 5B is a diagram of lipid accumulation in HepG2 cells of an MS group.
FIG. 5C is a diagram of lipid accumulation in HepG2 cells of an MC group.

Morphological observation was further carried out by oil red 0 staining, and the results are shown in FIGS. 5A-5C (inverted microscope×400), FIG. 5A is a diagram of lipid accumulation in HepG2 cells of an oleic acid modeling group; FIG. 5B is a diagram of lipid accumulation in HepG2 cells of an MS group; FIG. 5C is a diagram of lipid accumulation in HepG2 cells of an MC group. As can be seen, compared with the oleic acid modeling group, the MS group and MC group at 2 μg/mL can reduce lipid drops in the cells and lighten color. This is consistent with the test result of TG.

Example 4 Inhibitory Activity and Inhibitory Type of MC on Pancrelipase

In an experiment, 4-methylumbelliferyl oleate (4-MUO) was used as a substrate and a fluorescence detection method was used to evaluate the inhibitory activity of MC on pancrelipase (Type II, derived from a porcine pancreas).

The following groups were set (see also Table 1):

Blank group: no MC sample, only substrate, pancrelipase and Tris-HCL buffer;

Blank background group: no MC sample and pancrelipase, only substrate and Tris-HCL buffer;

Sample background group: no pancrelipase, only MC sample, substrate and Tris-HCL buffer;

Sample group: no Tris-HCL buffer, only MC sample, substrate and pancrelipase.

TABLE 1

Determination of pancrelipase activity in vitro

| | 4-MUO (μL) | Tris-HCL (μL) | MC sample (μL) | Lipase solution (μL) |
|---|---|---|---|---|
| Blank group | 50 | 25 | — | 25 |
| Sample group | 50 | — | 25 | 25 |
| Blank background group | 50 | 50 | — | 25 |
| Sample background group | 50 | 25 | 25 | — |

The inhibition rate was calculated according to the following formula:

Inhibition rate (%)=[($A_1$−$A_2$)−($A_3$−$A_4$)]/($A_1$−$A_2$)×100

$A_1$: Fluorescence value in blank group; $A_2$: Fluorescence value in blank background group; $A_3$: Fluorescence value in sample group; and $A_4$: Fluorescence value in sample background group.

The substances contained in each group were added to wells of a black 96-well plate in a ratio shown in Table 1. Three parallel experiments were set for each group, in which the concentration of 4-MUO is 0.1 mM, and the MC samples were dissolved in DMSO (set 6 different concentrations: 5, 10, 20, 40, 80 and 160 μg/mL), the concentration of the lipase solution is 1 mg/mL. After reacting for 30 mins at 25° C., 100 μL of 0.1M sodium citrate buffer solution was added to terminate the reaction. The lipase will catalyze the substrate 4-methylumbelliferyl oleate (4-MUO) to produce a product 4-methylumbelliferone, 4-methylumbelliferone had a fluorescence intensity at an excitation wavelength of 340 nm and an emission wavelength of 460 nm. By detecting the fluorescence value, it can be indirectly determine lipase activity, that is, the higher the lipase activity, the more the 4-methylumbelliferone produced by catalyzing and the stronger the fluorescence signal. Therefore, the product 4-methylumbelliferone was determined under conditions of an excitation wavelength of 360±40 nm and an emission wavelength 460±40 nm.

Figure 6:
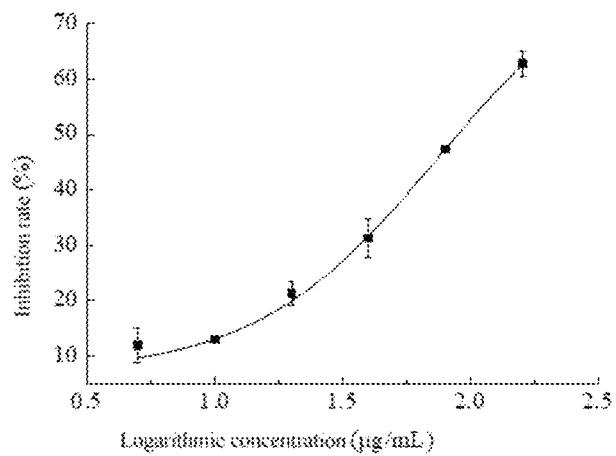
FIG. 6 shows a diagram of inhibitory activity of MC on pancrelipase as a function of concentration.

After converting 6 concentrations of MC described above into logarithmic concentrations, the logarithmic concentrations are taken as horizontal coordinates and the inhibition rates as longitudinal coordinates, and draw an S-shaped curve shown in FIG. 6, it can be seen that the inhibition rate of MC on pancrelipase increased with the increase of concentration. Further, based on the S-shaped curve, using software known in the art, the IC50 value was calculated to be 75.8 μg/mL. Results of this part indicated that MC had a certain inhibitory activity on the pancrelipase, reducing the intestinal intake of triglyceride by inhibiting a route of absorption of monoglyceride, and having a potential anti-obesity effect.

Figure 7A:
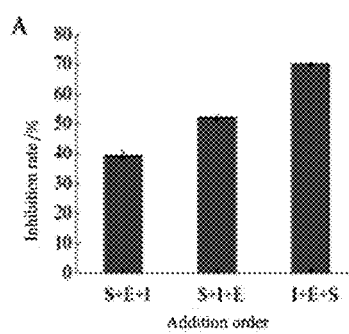
FIG. 7A is a diagram of results of inhibition rates of MS (Monascin) group reactants in different orders of addition.
Figure 7B:
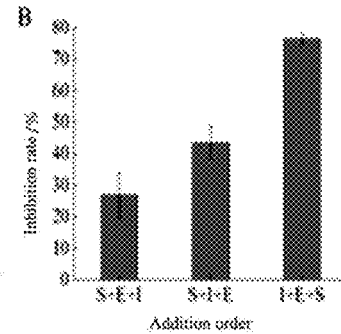
FIG. 7B is a diagram of results of inhibition rates of AK (Ankaflavin) group reactants in different orders of addition.
Figure 7C:
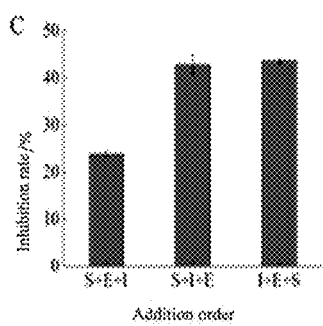
FIG. 7C is a diagram of results of inhibition rates of MC (Monascinol) group reactants in different orders of addition.

According to different forms and characteristics of binding between enzymes and inhibitors, the inhibitions can be divided into two types: reversible inhibition and irreversible inhibition. The irreversible inhibition usually binds to a group in an enzyme protein by a relatively strong covalent bond to inactivate an enzyme. The reversible inhibition is divided into competitive inhibition, non-competitive inhibition and anti-competitive inhibition. Researches have reported that the type of inhibition of MS and AK on pancrelipase is non-competitive inhibition. In this part of experiment, MS and AK were used as controls, and the type of inhibition of MC was determined by changing the order of adding reactants, the intervention concentrations of the three pigment inhibitors were all 80 μg/mL. Results are shown in FIGS. 7A-7C, FIG. 7A is a diagram of results of the inhibition rates of MS (Monascin) group reactants in different orders of addition; FIG. 7B is a diagram of results of the inhibition rates of AK (Ankaflavin) group reactants in different orders of addition; and FIG. 7C is a diagram of results of the inhibition rates of MC (Monascinol) group reactants in different orders of addition; it can be seen that the type of inhibition of MC is different from that of MS and AK. In FIGS. 7A-7C, S: substrate, I: inhibitor, E: enzyme.

The type of inhibition of MC on pancrelipase was determined based on the results of Lineweaver-burk double reciprocal plot method as follows. It is known in the art that if two straight lines intersect on 1/S axis, the type of inhibition is non-competitive inhibition; if two straight lines intersect on 1/V axis, the type of inhibition is competitive inhibition; and if the two straight lines are parallel, the type of inhibition is anti-competitive inhibition.

Figure 8:
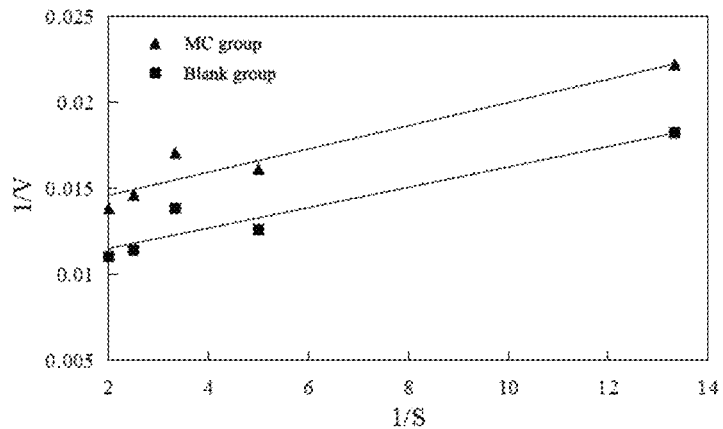
FIG. 8 shows a Lineweaver-Burk curve of MC.

FIG. 8 shows a Lineweaver-Burk curve of MC, where 1/S is a reciprocal of substrate concentration, 1/V is a reciprocal of reaction rate, the reaction rate is the fluorescence difference before and after the reaction divided by time difference. A basic process of experiment of drawing the Lineweaver-Burk curve was: under the condition of a determined lipase concentration (1 mg/mL), the enzymatic reaction rates were measured with a series of different substrate concentrations. The blank group contained no inhibitor MC (no MC sample, only different concentrations of substrate, pancrelipase and Tris-HCL buffer); in the MC group, 160 μg/mL of MC, different concentrations of substrate, pancrelipase and Tris-HCL buffer were added. It can be seen from FIG. 8 that the double reciprocal plot method showed that the two straight lines tend to be parallel, which belongs to the anti-competitive inhibition in the type of reversible inhibition, indicating that MC did not directly bind to the enzyme, and reduced the catalytic reaction rate of pancrelipase by binding to the enzyme-substrate complex.

Example 5 MC Animal Experiment Data 24 male Golden Syrian hamsters (hamsters for short) used in the animal experiment were purchased from Beijing Vital River Laboratory Animal Technology Co., Ltd., weighing 110-120 g, and aged 8 weeks.

After acclimation for a period of time, they were randomly divided into 3 groups, each with 8 animals, and the grouping and experiments were carried out as follows:
Every day starting from Day 1:
Normal group (NOR): take normal-chow diet freely, and gavage the same amount of CMC-Na solution as the MC group;
High fat group (HFD): take high-fat chow diet freely, and gavage the same amount of CMC-Na solution as the MC group;
MC group: take high-fat chow diet freely, and gavage MC (dissolved in CMC-Na solution) at a dose of 20 mg/kg body weight.

The weight and food intake of the hamsters were measured every week. After 10 weeks, tissue samples or serum samples were collected and the following analysis was performed.

5.1 the Effects of MC on the Body Weight, Liver, Kidney and Adipose Tissue Weight of Hamsters The liver weight, kidney weight, perirenal and periepididymal fat pad weight and fat index were recorded in Table 2. From the above experimental data, it can be seen that, compared with the HFD group, the MC group can significantly inhibit ($p<0.05$) the weight gain in body and liver and peripheral fat accumulation of the hamsters fed with high-fat diet.

TABLE 2

| Group | NOR | HFD | MC |
|---|---|---|---|
| Food intake(g) | $8.27 \pm 0.23^a$ | $7.03 \pm 0.24^b$ | $6.71 \pm 0.35^b$ |
| Weight gain(g) | $35.80 \pm 4.99^a$ | $53.14 \pm 9.02^b$ | $22.33 \pm 4.12^c$ |
| Liver weight(g) | $4.02 \pm 0.20^a$ | $5.57 \pm 0.14^b$ | $4.21 \pm 0.17^a$ |
| Kidney weight(g) | $1.09 \pm 0.04^a$ | $1.10 \pm 0.05^a$ | $0.97 \pm 0.04^a$ |
| Weight of perirenal fat pad (g) | $1.56 \pm 0.33^a$ | $2.94 \pm 0.41^b$ | $1.62 \pm 0.19^a$ |
| Weight of periepididymal fat pad (g) | $2.87 \pm 0.37^a$ | $4.87 \pm 0.47^b$ | $2.99 \pm 0.28^a$ |
| Fat index(weight of perirenal and periepididymal fat pad/weight of body) | $2.97 \pm 0.37^a$ | $4.79 \pm 0.29^b$ | $3.56 \pm 0.26^a$ |

5.2 the Effect of MC on TG (Triglyceride) and TC (Total Cholesterol) in Liver and Serum of the Hamsters TC and TG in the liver were extracted based on the Folch method, the TC and TG detection kits produced by Nanjing Jiancheng Bioengineering Institute was used to detect the contents of TC and TG in liver tissue according to the method provided in the instructions.

Cobas8000 E602 full-automatic biochemical analyzer (Roche Diagnostics Co., Ltd., Germany) was used to measure TC and TG in serum of collected serum samples. The results were recorded in Table 3.

According to the data in Table 3, contents of TG and TC in the liver and serum of hamsters in the HFD group were significantly higher than those in the NOR group ($p<0.05$). Compared with hamsters in the HFD group, the contents of TG and TC in the liver and serum of hamsters in the MC group were significantly decreased ($p<0.05$), and it was particularly worth noting that the average content of TG in the liver of high-fat diet hamsters intervened by MC was the same as that in the NOR group, indicating that MC has a significant inhibitory effect on lipid accumulation in serum and liver caused by a high-fat diet, especially the better inhibitory effect on TG accumulation in liver and serum, which is consistent with the results of cell experiment where MC inhibits TG accumulation in HepG2 cells.

TABLE 3 contents of TC and TG in liver and serum

| Group | NOR | HFD | MC |
|---|---|---|---|
| Serum TG (mmol/L) | $1.89 \pm 0.23^a$ | $4.38 \pm 0.414^b$ | $2.97 \pm 0.39^c$ |
| Serum TC (mmol/L) | $3.81 \pm 0.12^a$ | $4.90 \pm 0.24^b$ | $4.73 \pm 0.21^b$ |
| Liver tissue TG (mg/g) | $9.63 \pm 0.62^a$ | $12.81 \pm 0.86^b$ | $9.62 \pm 0.34^a$ |
| Liver tissue TC (mg/g) | $6.53 \pm 0.19^a$ | $23.94 \pm 1.25^b$ | $20.66 \pm 0.58^c$ |

5.3 Histological Analysis of Liver and Adipose Tissues of Hamsters

Figures 9A, 9B, 9C:
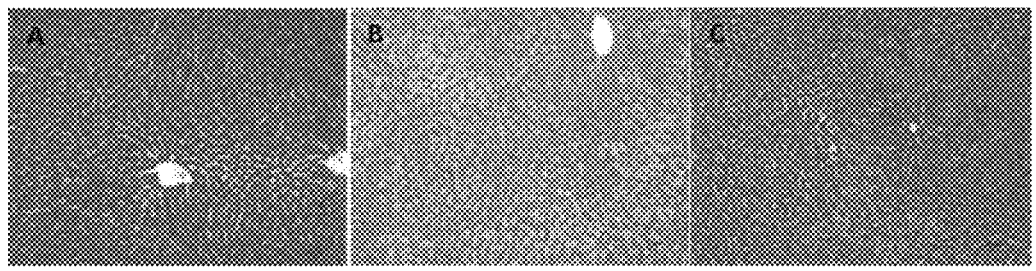
FIG. 9A-FIG. 9C show results of liver tissue sections of hamsters in each group under a 100× light microscope.
Figures 9A, 9B, 9C:
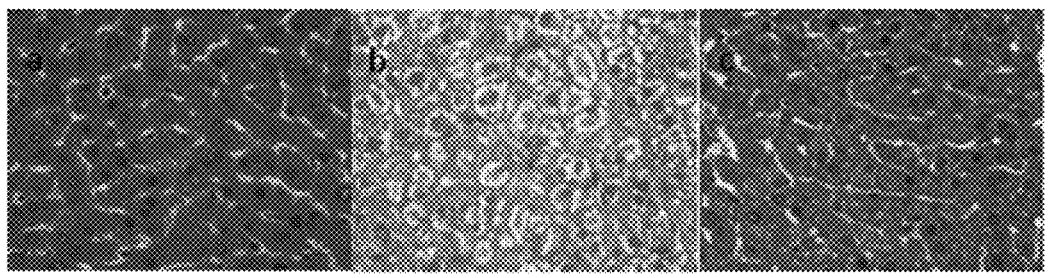

FIG. 9A-FIG. 9C show results of liver tissue sections of hamsters in each group under a 100× light microscope; FIG. 9a-FIG. 9c show results of liver tissue sections of hamsters in each group under a 400× light microscope; where FIG. 9A and FIG. 9a are the NOR group, FIG. 9B and FIG. 9b are the HFD group, and FIG. 9C and FIG. 9c are the MC group. As can be seen, compared with enlarged liver cells caused by lipid accumulation in the HFD group, the lipid accumulation in the cells of the MC group was significantly reduced, and liver cell cords tended to be normal.

Figures 10A, 10B, 10C:
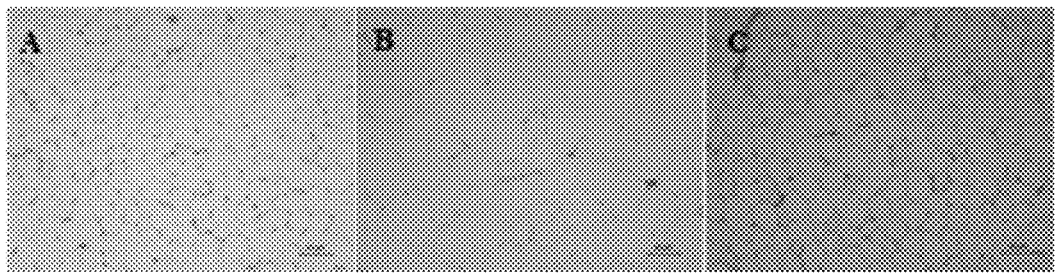
FIG. 10A-FIG. 10C show results of adipose tissue sections of hamsters in each group under a 100× light microscope.
Figures 10A, 10B, 10C:
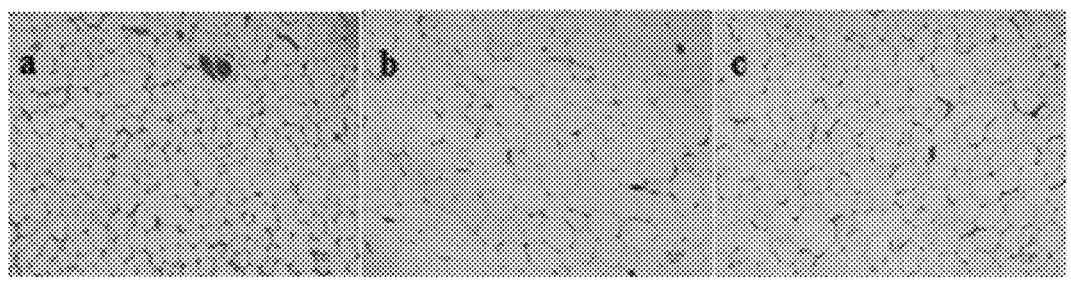

FIG. 10A-FIG. 10C show results of adipose tissue sections of hamsters in each group under a 100× light microscope; FIG. 10a-FIG. 10c show results of adipose tissue sections of hamsters in each group under a 400× light microscope; where FIG. 10A and FIG. 10a are the NOR group, FIG. 10B and FIG. 10b are the HFD group, and FIG. 10C and FIG. 10c are the MC group. As can be seen, adipose tissue cells of periepididymal and perirenal in the HFD group had a significantly larger volume than those in the NOR group, while the cells in the MC group had a significantly smaller volume than that in the HFD group, and the volume of the cells was between volumes of the cells of the NOR group and the HFD group.

Based on the above cell experiments, in-vitro enzyme experiments and animal experiments, MC can effectively prevent weight gain, peripheral fat accumulation, accumulation of TC and TG in blood and liver caused by high-fat diet. It can be used to prevent and treat of abnormal lipid metabolism caused by obesity and related metabolic syndrome, such as fatty liver, diabetes, asthma and osteoarthritis. The red yeast rice which is rich in MC and obtained by fermentation of the *Monascus* provided by the present application, or the MC or MS obtained by extraction and separation of the red yeast rice can be used to develop functional foods related to regulation of abnormal lipid metabolism and become raw materials for medicines.

Example 6 Preparation of Monascinol by Using *Monascus* Provided by the Present Application The *Monascus* was *Monascus* with the Accession No. CGMCC 18578, which was deposited at the China General Microbiological Culture Collection Center (abbreviated as CGMCC) on Sep. 20, 2019. The raw material was generally commercially available rice, and ingredients in mediums are all commercially available conventional reagents in the art.

I. Preparation of Monascinol by Using the *Monascus* (No. CGMCC 18578), Including the Following Steps:

1) the rice was soaked in water at a mass-to-volume ratio of 1:1 (kg/L) at room temperature for 4-24 hours, and was put into a culture flask after the water was drained off, sterilizing for 20 mins at 121° C. and 0.1 MPa to obtain a solid fermentation medium;
2) the *Monascus* (No. CGMCC 18578) stored in a refrigerator at 4° C. was transferred to a fresh wort slant medium, and cultured at 30° C. for 48 hours to activate the *Monascus*; The sterile water was poured into the slope under aseptic operation, and the spores were scraped off by the inoculation loop to make the spore suspension which was transferred to the inoculum medium, shaking at 30° C. for 36 h at 180 rpm to obtain the inoculum culture of the *Monascus*.

In this case, the slant medium for activation was obtained by the followings: slightly pulverizing barley malt kernels, weighing 250.0 g, adding 1 L of water, being subjected to a thermostatic water bath at 60° C. for 4 hours; after filtration, adding water, so as to dilute the sugar content to 12° Brix, then adding 3.0 g agar, and sterilizing at 121° C. and 0.1 MPa for 20 mins.

The inoculum medium was obtained as follows: dissolving 6.0 g of glucose, 2.0 g of peptone, 1.0 g of $NaNO_3$, 1.0 g of $KH_2PO_4$ and 0.5 g of $MgSO_4$ into 100 mL of water, and aliquoting into 250 mL of conical flasks, which is sealed with 8 layers of gauze and kraft paper, and then sterilizing at 121° C. and 0.1 MPa for 20 mins.

3) The inoculum culture of the *Monascus* was filtered with a double-layer gauze to remove mycelium, the inoculum culture of the *Monascus* with mycelium removed was injected into the solid fermentation medium at a volume to weight ratio of 1:5-10 L/kg, in order to ferment at 30° C. for 20 days, so as to obtain fermented rice, namely red yeast rice;
4) the fermented red yeast rice was dried in an oven at 60° C. and pulverized, and then extracted with 60%-90% ethanol, where the weight ratio of the red yeast rice to ethanol was 1:5-20, and then the extracted liquid was separated by high performance liquid chromatography to obtain the Monascinol.

II. Analysis of Structure of MC Prepared by the *Monascus* (No. CGMCC 18578)

Figure 11:
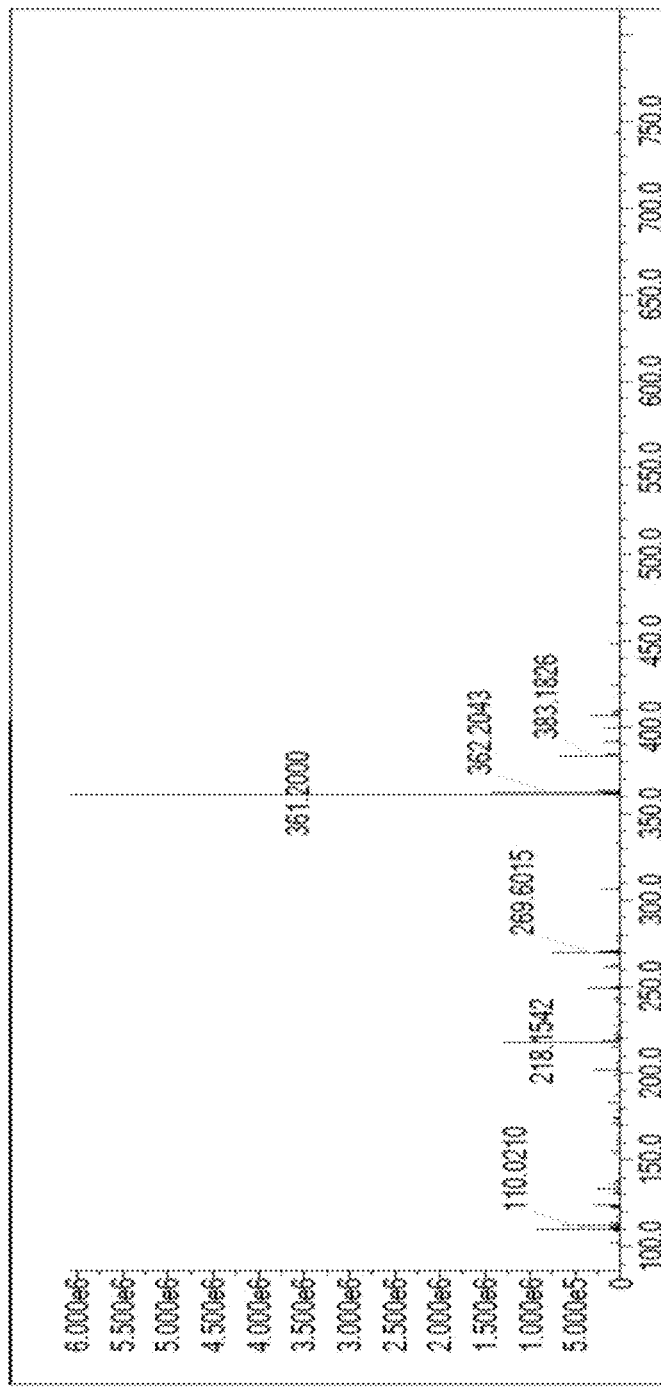
FIG. 11 shows a primary positive ion spectrum of LCMS of MC.
Figure 12:
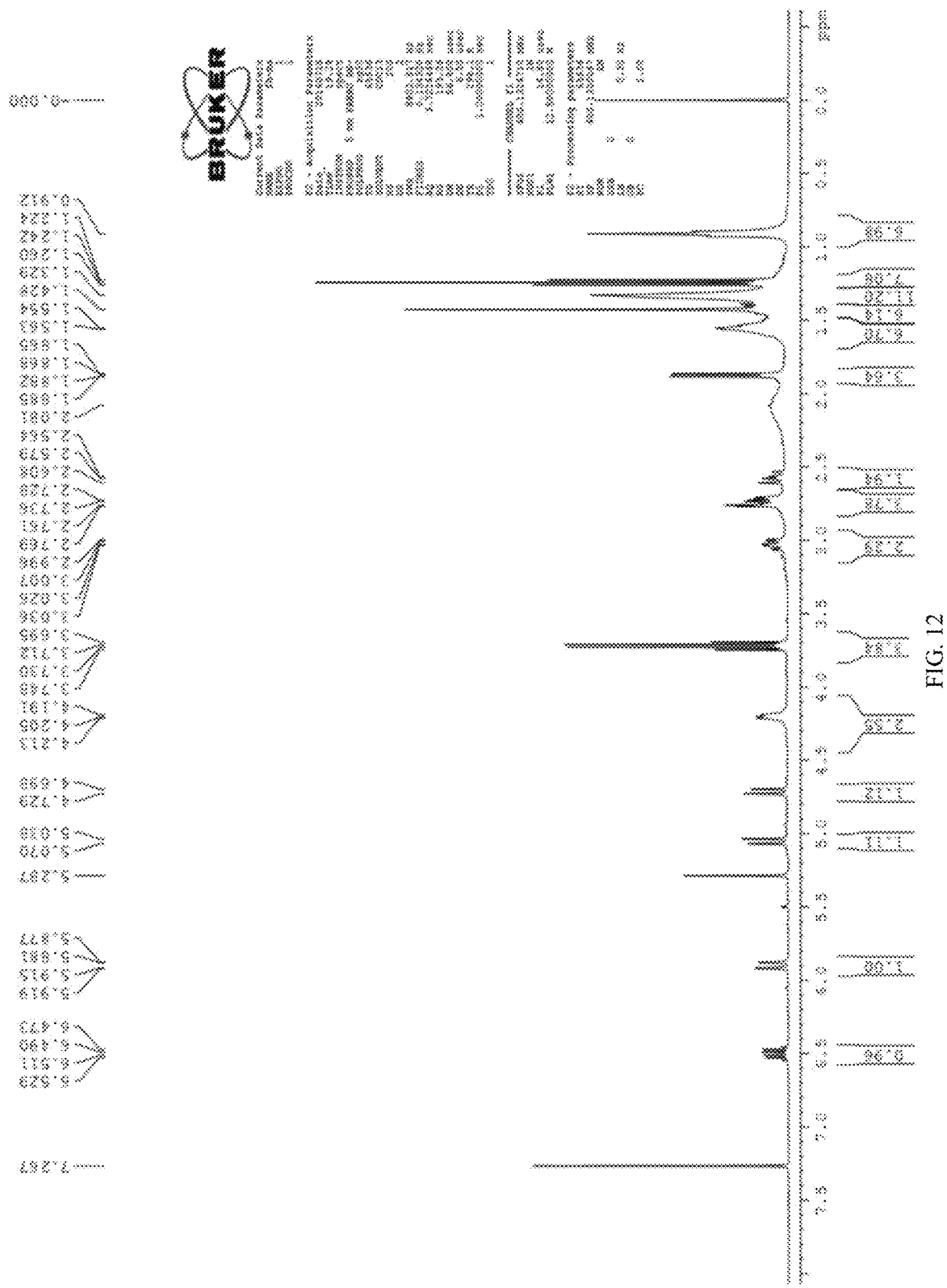
FIG. 12 shows a $^1$H-NMR spectrum of MC.
Figure 13:
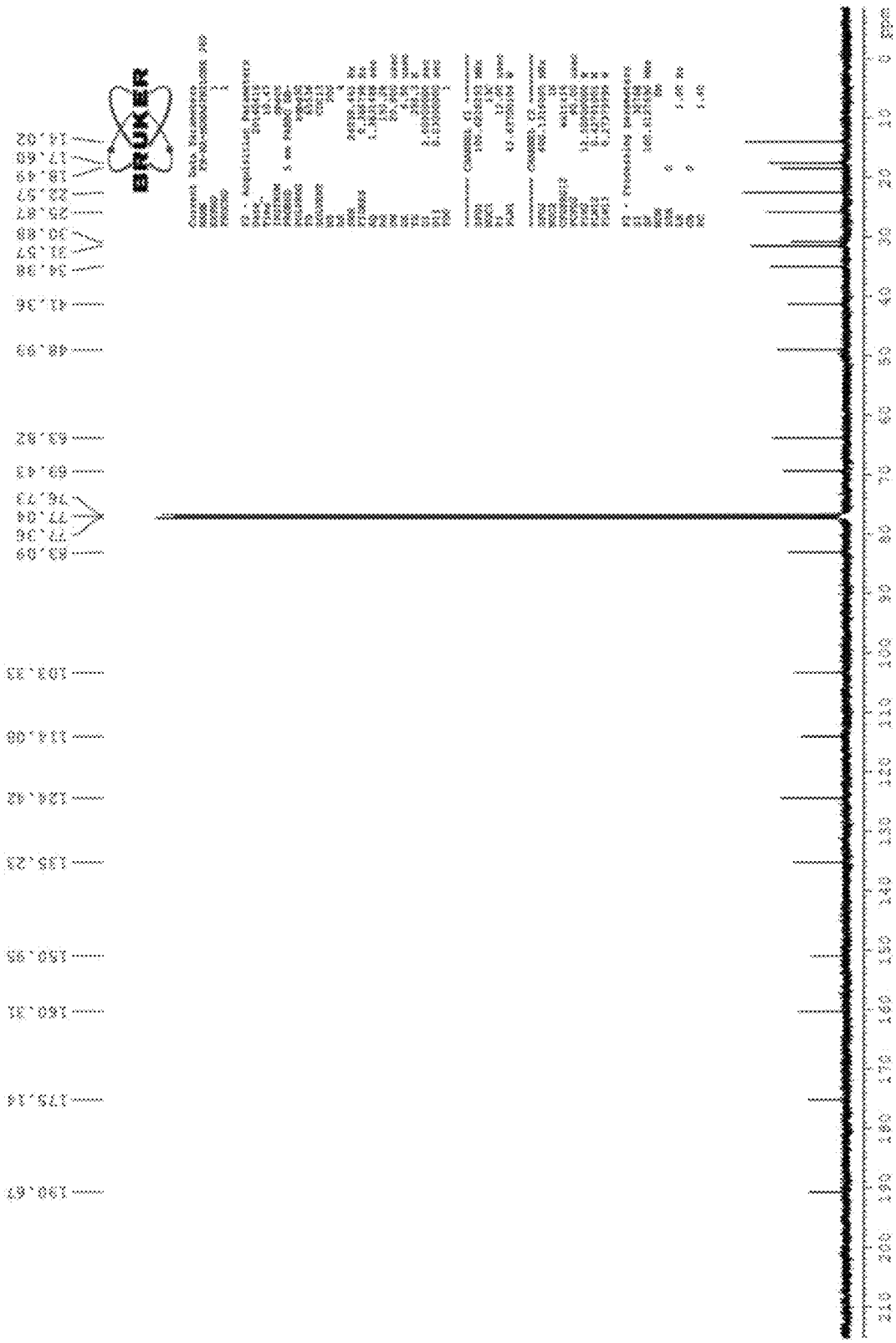
FIG. 13 shows a $^{13}$C-NMR spectrum of MC.

The result of ESI-MS measurement of Monascinol is shown in FIG. 11, where a primary positive ion peak thereof m/z is 361.2000[M+H]$^+$, and the molecular formula of the compound is $C_{21}H_{28}O_5$. The $^1$H-NMR result of Monascinol is shown in FIG. 12, and the $^{13}$C-NMR result of Monascinol is shown in FIG. 13, these results are the same as the structure characterization information of Monascinol recorded in the document JP2008-56618A.

III. Determination of Content of MC Prepared by *Monascus* (No. CGMCC 18578)

Drawing of MC Standard Curve:

The prepared and purified MC (HPLC purity >95%) was dissolved in 70% ethanol to prepare a 4 mg/ml of standard stock solution, MC standard working solutions with concentrations of 400, 200, 100, 50, 25 µg/ml were obtained by gradient dilution, 1260 HPLC (Agilent Technologies Co. Ltd., USA) was used to detect and draw a standard curve, with HPLC conditions are as follows: chromatographic column: ZORBAX Eclipse Plus C18 (5 µm, 4.6×250 mm); mobile phase: acetonitrile-0.1% formic acid water 60:40 (V/V), isocratic elution; diode array detector; detection wavelength: 390 nm; column temperature: 25° C.; flow rate: 1 mL/min; injection volume: 20 µL. The peak area Y is used to perform linear regression on the concentration X, to obtain a MC regression equation as Y=31.63x+122, $R^2$=0.998.

Determination of MC Content in Fermented Red Yeast Rice:

The fermentation product (i.e., fermented red yeast rice) was dried at 60° C., pulverized and sieved (200 mesh), and then 0.50 g of powders was accurately weighed, put into a 10 mL of centrifuge tube, and was subjected to ultrasonic extraction by 70% ethanol solution with a material-to-liquid ratio of 1:20 for 30 minutes, and then was centrifuged at 3500 r/min for 10 mins, where the supernatant was diluted appropriately, and was filtered through 0.22 µm organic filter, with the extract being extracted into a liquid phase vial and being detected by HPLC. Based on the MC peak area detected in the sample, dilution times of samples and the MC standard curve, the MC content in the fermentation product was calculated to be 8 mg/g. This content is much higher than the MC content (0.31 mg/g) in red yeast rice fermented with *Monascus* used in Taiwan invention patent TW1437001B. A red yeast product which is rich in MC and obtained by fermentation of the *Monascus* (No. CGMCC 18578), e.g., fermented red yeast rice, can be used to develop functional foods related to regulation of abnormal lipid metabolism and become raw materials for medicines.

What is claimed is:

1. A method for treating a disease related to abnormal lipid metabolism in an individual, comprising administering to the individual a product containing monascinol in a form of a unit dosage, wherein the disease comprises weight gain in body, peripheral fat accumulation, and accumulation of total cholesterol and triglyceride in blood and liver caused by high-fat diet;

wherein the product containing monascinol exerts a fat-reducing effect via monascinol uncompetitively inhibiting an activity of pancreatic lipase, in order to inhibit weight gain in body, peripheral fat accumulation, and the accumulation of triglyceride and total cholesterol in blood and liver by high-fat diet;

wherein the unit dosage contains 50-200 mg of the monascinol.

2. The method according to claim 1, wherein the product is used for reducing triglyceride.

3. The method according to claim 1, wherein the product is a fat-reducing drug.

4. The method according to claim 3, wherein the fat-reducing drug is used for treating a disease related to abnormal lipid metabolism in the individual.

5. The method according to claim 4, wherein the disease related to abnormal lipid metabolism in the individual comprises one or more of fatty liver, cardiovascular disease, diabetes and asthma.

6. The method according to claim 5, wherein the fatty liver comprises non-alcoholic fatty liver.

7. The method according to claim 3, wherein a dosage of the fat-reducing drug is in the form of a hard capsule, a soft capsule, a tablet, a granule, a powder, an oral liquid or an injection.

* * * * *